United States Patent [19]

Caldwell et al.

[11] Patent Number: 5,273,437
[45] Date of Patent: Dec. 28, 1993

[54] AUDIENCE PARTICIPATION SYSTEM

[75] Inventors: Frank Caldwell, Monmouth Junction, N.J.; Michael J. Nolan, Worthington, Ohio

[73] Assignee: Johnson & Johnson, New Brunswick, N.J.

[21] Appl. No.: 62,487

[22] Filed: May 14, 1993

Related U.S. Application Data

[63] Continuation of Ser. No. 722,739, Jun. 27, 1991, abandoned.

[51] Int. Cl.⁵ ............................................. G09B 7/00
[52] U.S. Cl. .................................. 434/351; 434/350; 434/322; 455/2
[58] Field of Search ............... 434/350, 351, 322, 352; 455/2; 358/84, 85, 86

[56] References Cited

U.S. PATENT DOCUMENTS

| | | | |
|---|---|---|---|
| 3,315,375 | 4/1967 | Heinz | 434/351 |
| 3,416,243 | 12/1968 | Greenberg et al. | 434/351 |
| 3,623,242 | 11/1971 | Hoover | 434/351 |
| 3,676,939 | 7/1972 | Oberst et al. | 434/351 |
| 3,762,072 | 10/1973 | From | 434/351 |
| 3,784,979 | 1/1974 | Friedman et al. | 434/350 |
| 4,290,141 | 9/1981 | Anderson et al. | 455/2 |
| 4,377,870 | 3/1983 | Anderson et al. | 455/2 |
| 4,764,120 | 8/1988 | Griffin et al. | 434/350 |
| 4,926,255 | 5/1990 | Von Kohorn | 434/323 |

FOREIGN PATENT DOCUMENTS 0059784 2/1990 Japan .................................. 434/350

OTHER PUBLICATIONS

Rauland—Borg Corp., Conference System—Philips CCS-400.

*Primary Examiner*—Jessica J. Harrison
*Attorney, Agent, or Firm*—Joel R. Petrow

[57] ABSTRACT

An audience participation system and method utilizing wireless transmission is provided. The system includes a plurality of modules in the possession of an audience, each module having a keypad or other means which is activated by a member of the audience in order for the audience to respond to a question posed by the speaker during his presentation. After the speaker poses a question, the audience responds by supplying information through a physical input into the module. The module then encodes the information provided into an encoded electrical pattern. This encoded electrical pattern is modulated into an electromagnetic signal which is then electromagnetically transmitted. A base station has a receiver for capturing the electromagnetic signal which is the demodulated into the encoded electrical pattern originally transmitted. The data are retrieved and collected, and then statistically analyzed according to the wishes of the speaker and displayed to present a statistical analysis of the combined audience response to the question posed.

8 Claims, 4 Drawing Sheets

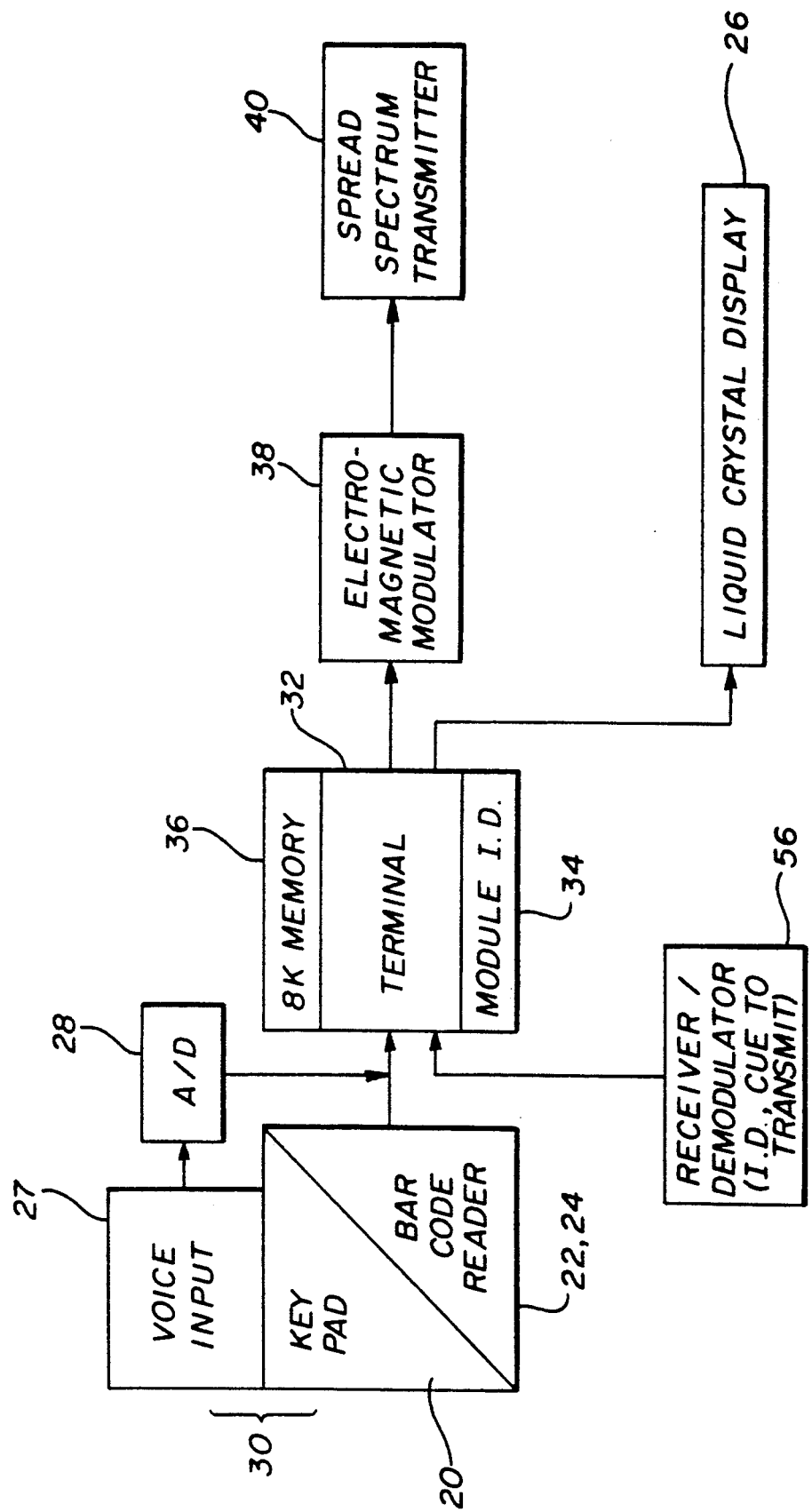

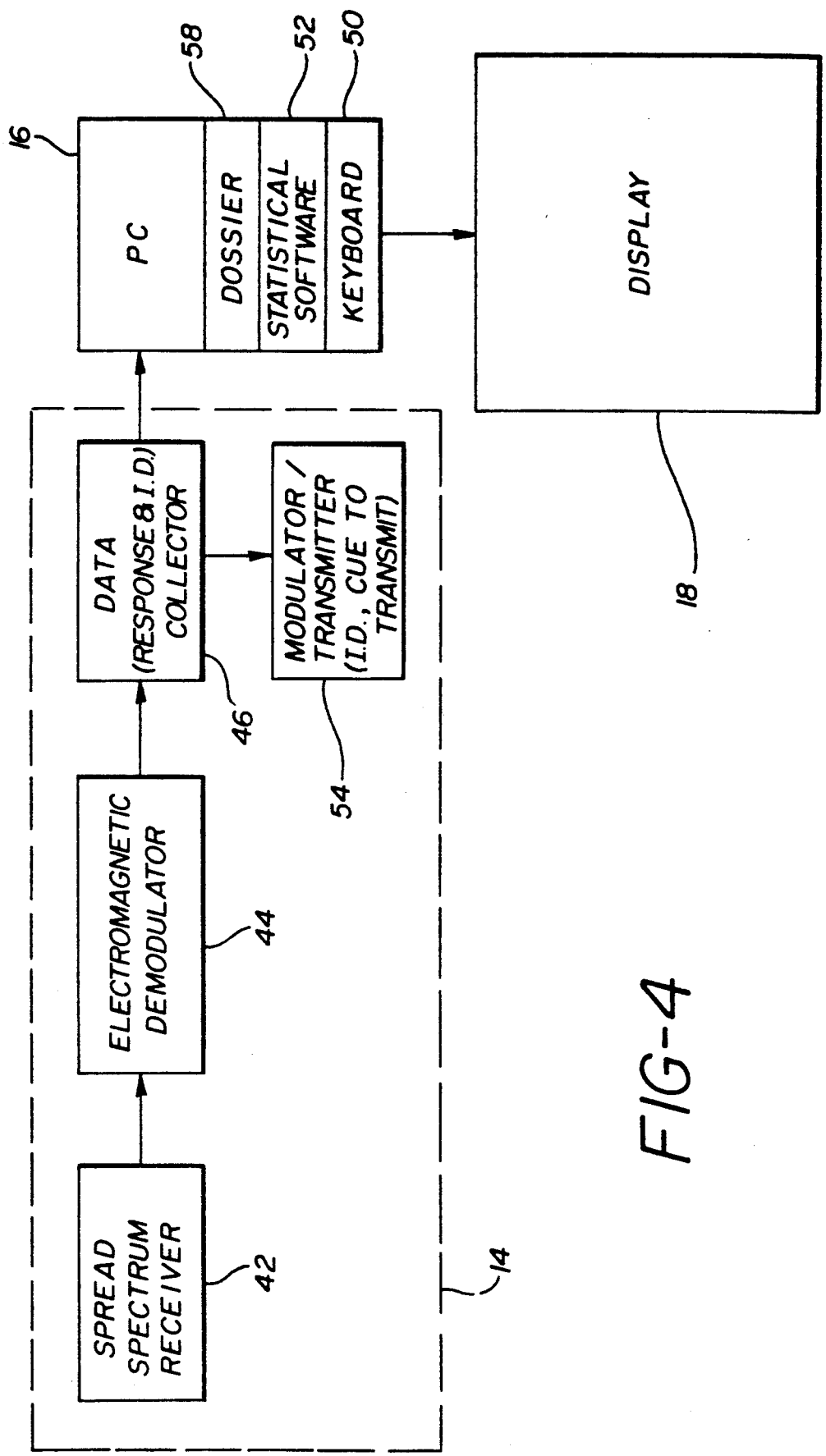

AUDIENCE PARTICIPATION SYSTEM

This is a continuation of application Ser. No. 07/722,739, filed Jun. 27, 1991, now abandoned.

BACKGROUND OF THE INVENTION

Although there have been a number of technological developments in the area of systems for making presentations to audiences such as overhead projectors, large screen televisions, electronic overhead projection systems for displaying computer data and video tape presentation systems, there has not been similar advances in the way that the audience can communicate with the speaker. Developments in this area have been limited to methods by which selected members of the audience can communicate with the speaker and the remainder of the audience by way of voice audio systems such as the Philips CCS 400 conference system. Systems such as these consist of chairman units, delegate units and roving microphones which provide participants of a meeting with increased and improved speech intelligibility through sound amplification and distribution. Conference participants have their own microphones and a roving microphone allows members of the audience to speak when selected by the chairman. This type of system, representative of similar units, does not allow for the collection of data or information from a large number of audience members.

Another type of system that is used to obtain information from an audience is the commonly known 800 or 900 telephone polling system. Typically, this system consists of a broadcast medium such as radio or television posing a question to its audience and then requesting a response by having members of the audience call one of several numbers associated with a proposed response. Although this type of system is capable of providing large amounts of data, it does not have any selectivity with regard to the audience participating in the survey and, indeed, is susceptible to single individuals calling in a multiple number of times. Further, this type of system is not practical for the typical presentation made to an audience in the usual business or educational setting.

Previous attempts to measure the effectiveness of a presentation were to gather information from participants and concentrated on written, after the event, questionnaires which proved to be somewhat ineffective. The use of questionnaires during a presentation improved the response quality, but were still considered to require excessive effort to obtain, analyze, and distribute the results.

A clear drawback of the above written response approach, is that it does not provide fresh and immediate responses from the audience, nor does it provide the ability to present the results immediately.

Known in the art are hard-wired, one direction, response devices which allow an audience to provide a "yes" or "no" response to a question.

Other systems employing personal computers in a local area network have been used to record findings for group presentations, but required a system that was uniquely designed for the event and the location, and substantial expertise to preplan and apply the collected data. The size and weight of personal computers and the requirement that they be hard-wired into a local area network further limits their use in the traditional setting of a speaker and his audience.

It is therefore an object of the present invention to provide a system that allows a speaker to pose a question to an audience and request a response which the audience can provide by a simple physical input to a device in their possession that registers on a station near the speaker and receives such responses and presents the data in a statistically understandable form.

Another object of the invention is to allow the speaker to adjust his presentation and respond to audience interest while giving the presentation.

It is a further object of the invention to provide a system where the devices used by the audience are uniquely coded with the identity, or characteristics, of the individuals possessing the devices.

It is another object of the invention to be able to have dossiers of the audience in the station located near the speaker to provide not only statistical analyses of the responses, but a correlation with the identities or characteristics of the respondents.

It is another object of the invention to provide a system wherein the station located near the presenter is able to quickly interrogate each of the units in the possession of the audience in order to receive the data in a organized and coherent manner by having the modules in the possession of the audience transmit to the station only when instructed to do so by the station.

SUMMARY OF THE INVENTION

These objects and other aspects of the invention are accomplished by use of a plurality of modules in the possession of an audience, each module having a keypad or other means which is activatable by a member of the audience in order for the audience to respond to a question posed by the speaker during his presentation. After the speaker poses a question, the audience responds by supplying information through a physical input into the module. The module then encodes the information provided into an encoded electrical pattern. This encoded electrical pattern is modulated into an electromagnetic signal which is then electromagneticly transmitted. A base station has a receiver for capturing the electromagnetic signal which is then demodulated into the encoded electrical pattern originally transmitted. The data are retrieved and collected, and then statistically analyzed according to the wishes of the speaker and displayed to present a statistical analysis of the combined audience response to the question posed.

The invention may further include means wherein members of the audience are individually identified, and this information is transmitted along with the response and correlated during the analysis to provide further statistical information to the speaker. If the base station also includes a dossier on the members of the audience, further analysis may be performed on the responses that are correlated with characteristics of the audience members.

In order that the base station can receive information in an orderly fashion, the base station may further include a transmitter which sends an electromagnetic signal to a second receiver contained within the audience module that provides a cue from the base station to the audience module that the base station is prepared to receive the transmission from a specifically identified audience module.

DESCRIPTION OF THE DRAWINGS

FIG. 3 is a block diagram showing the essential elements of the audience module portion of the present invention.

FIG. 4 is a block diagram showing the essential elements of the base station portion of the present invention.

DESCRIPTION OF THE PREFERRED EMBODIMENT

Figure 1:
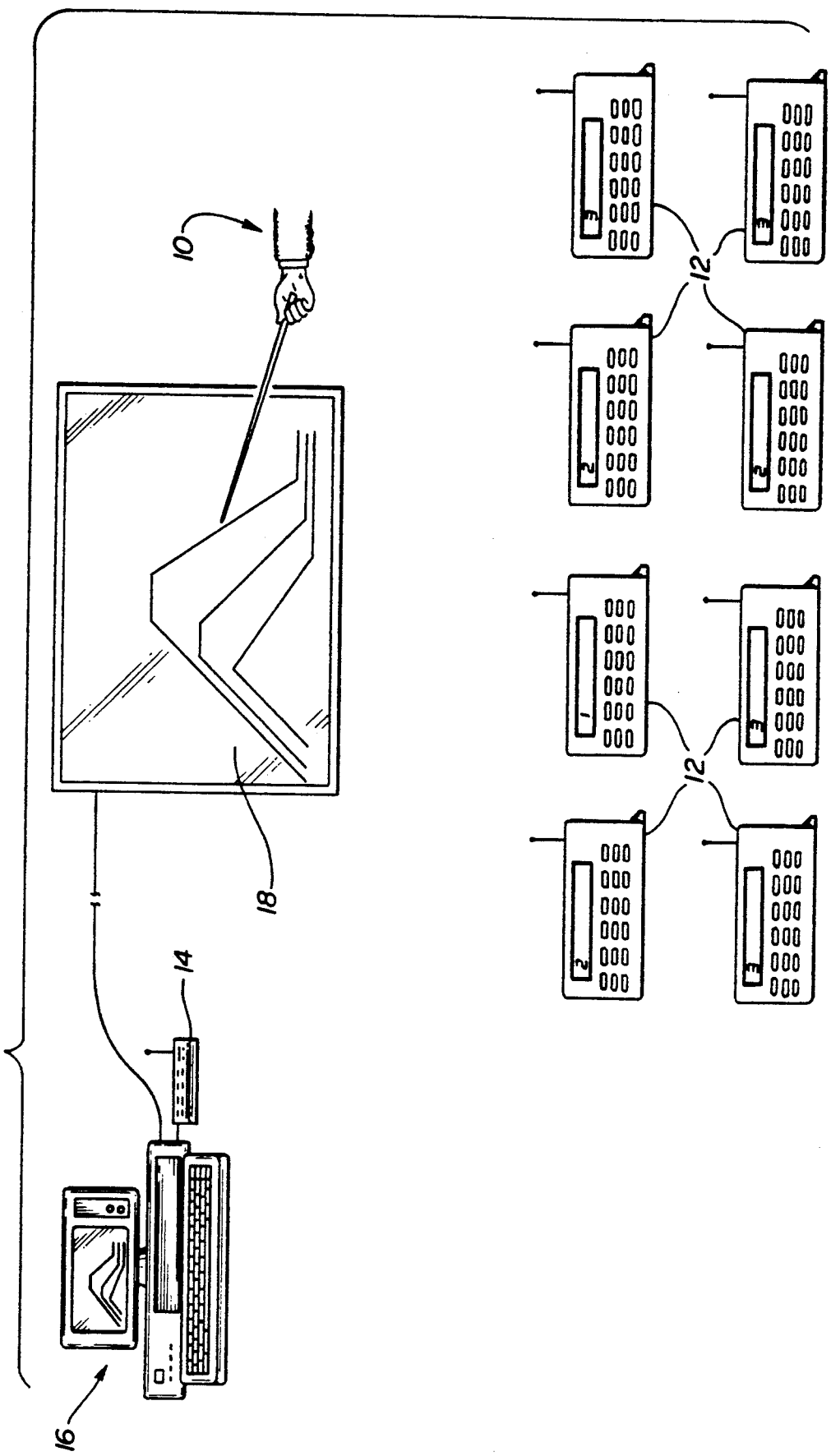
FIG. 1 is a plan view of the physical appearance of the present invention as it would be put into use.

Referring now to FIG. 1, a general description of the operation of the system of the present invention can be given. During the course of a presentation, a speaker 10 requires a response from an audience attending his presentation. Each member of the audience has an audience module 12 which is a hand-held unit. This audience module accepts a physical input from the member of the audience possessing an individual module, and transmits the response by electromagnetic radiation to an electromagnetic receiver contained in base station 14.

The information collected from the audience modules is then transferred to a computer 16 which can then, with the use of appropriate software, perform statistical analysis on the data received and immediately present this statistical analysis on display 18.

Figure 2:
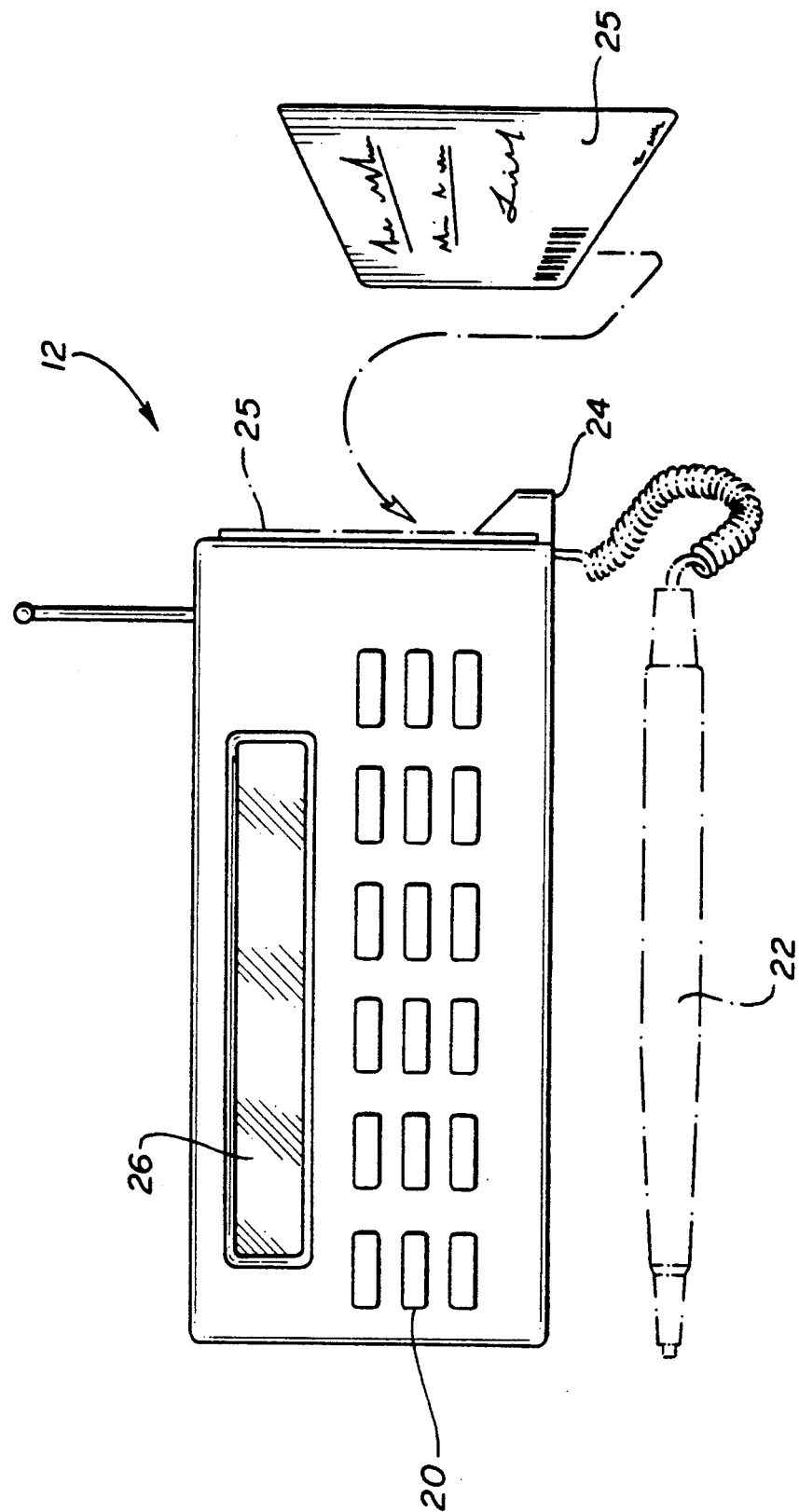
FIG. 2 is a plan view of the audience module portion of the present invention showing the physical appearance of said module.

Turning now to FIG. 2, the details of the audience module, hand-held unit 12, is shown. From its outward appearance and from the user's point of view, the module consists of a keypad 20 which allows an audience member to enter a response by pushing the appropriate alpha-numeric keys.

Separately, the identity of the person using a particular module can be entered into the module by means of a bar code scanner 24 which can read a bar code encoded identification badge 25 worn by an audience participant, and removed and dragged through the bar code scanner at the beginning of a presentation.

Another means by which a response may be entered is by use of light pen 22 which can be used to enter lengthy or non-standard responses which are found on a separate printed sheet containing these responses along with the bar code equivalent that can be read into the module 12 by tracking light pen 22 across the bar code associated with the appropriate response contained on such a sheet (not shown).

A further feature of the module is a display 26 contained on the module that can prompt a participant through the process of responding to a question from the speaker, can lead the member of the audience through the initial setup of the module for use during a presentation and can display, for means of confirmation, a response that was entered by the audience participant. The display may be of the liquid crystal type for low power consumption, or may be of the "touch screen" type which combines the function of keypad 20 with that of the display 26.

Referring now to FIG. 3, a functional block diagram of the audience module is shown. A digital input means, such as keypad 20 or bar code readers 22 or 24, provides a method for the audience participant to supply information to the module in his possession. Such an input under the appropriate circumstances may be a voice input. The audience member would speak into a voice input means 27 which would contain a microphone and any necessary electronics such as limiters, amplifiers and automatic gain control. Because such a voice input produces an analog output, the analog output would be processed by analog-to-digital converter 28 to produce a digitally encoded electrical output before further processing.

The output of input means 30 whatever it may be is provided as an input to terminal 32. Terminal 32 is of the type known as an intelligent terminal module, and is capable of acting as the controller for all the devices and functions within audience module 12. Examples of such intelligent terminal modules are the Links model manufactured by Murata, Inc. of 9 Columbia Drive, Amherst, N.H. 03031; the TWII model manufactured by Videx, Inc. of 1105 N.E. Circle Blvd., Corvallis, Oreg. 97330-4285; and the Model 95 by Hewlett Packard, Inc of P.O. Box 10301, Palo Alto, Calif. 94303-0890 which is preferred in this embodiment. This terminal, besides containing circuitry for turning the physical input of the input means 30 into an encoded electrical pattern, also contains a module I.D. 34, and memory 36.

The module I.D. is a tag which is unique among the population of audience modules that is given to a particular audience. This module I.D. particular to each module, allows the receiving base station to identify which module at any time, is transmitting a given response. In addition, memory 36, allows storage of information that may be utilized repeatedly and at any time during a particular session with an audience. The Hewlett Packard 95 of this embodiment can store 512 kilobytes of data within the memory contained therein.

The encoded electrical pattern produced by the terminal 32 from the input 30 is supplied to an electromagnetic modulator 38. This data transfer is accomplished by means of an RS232 protocol, known to those in the field. This protocol allows transfer of data at the rate of 9600 baud (approximately 9600 bits/second). Data transfer by RS232 is serial, and the electromagnetic modulator accepts this input and acts as a parallel bus link, allowing further processing of data in a parallel fashion.

The electromagnetic modulator is preferably of the spread spectrum type. Spread spectrum, known to those working in the art, is a method of modulating a radio frequency signal such that it occupies a wider band than is necessary to transmit the information. Spread spectrum communication was particularly valued by the military for its anti-jamming, anti-interference characteristics. Declassification of this technology and radio spectrum rule changes since 1985 have allowed commercial, unlicensed spread spectrum use.

Spread spectrum provides local high speed, wireless data rate transmission. Undistorted transmission of both audio and data is possible by use of a digitally encoded signal. This type of digital transmission has relatively high security from external unauthorized listening or data collection and, because of its digital and redundant nature, is relatively insensitive to external emissions from interference sources such as motors, lights and other RF transmitters.

As is known in the art, spread spectrum has other important advantages such as low power consumption, a robust nature with regard to data transmission errors, and no frequency peaks.

After appropriate processing as above, an electromagnetic signal is transmitted by transmitter 40 over a predetermined frequency band. Actual transmission of the RF signal is by a standard $\frac{1}{4}$ wavelength antenna which may be either internal or external to the enclosure. As can be appreciated by one practicing in the field, other electromagnetic modulation and transmission schemes may be employed, such as using infrared light.

The frequency band allowed for this application is 902 mHz to 928 mHz in North American and about 2.4 gHz (2400 mHz) in Europe. Transmission power is typically between 100 mW (0.1 W) and 500 mW ($\frac{1}{2}$ Watt) with a range of between 500 ft. and 2000 ft., respectively. Although the manufacture of a spread spectrum device requires approval by the Federal Communications Commission, as do may other electronic devices such as personal computers, use does not require a license. This is a distinct advantage over radio frequency transmission systems traditionally employed, which require an FCC site license, often difficult to obtain. Electromagnetic modulator 38 and spread spectrum transmitter 40 are known in the art, typically combined into a single unit. In this embodiment a preferred unit is the Proxim Spread Spectrum Transceiver manufactured by Proxim, Inc. of 295 North Bernardo Avenue, Mountain View, Calif. 94043. This device is capable of transmitting and receiving 242 kilobits of data per second. The reception portion of this unit may be put to a use, later described.

Referring now to FIG. 4, base station 14 is shown to comprise in functional block diagram, a spread spectrum receiver 42, which is appropriately tuned to the frequency band of the transmitters associated with the audience modules.

After receiving the electromagnetic signal, it is demodulated by electromagnetic demodulator 44 which provides in electrical form the data corresponding to the information transmitted by an audience module in data collector 46.

The spread spectrum receiver 42 and electromagnetic demodulator 44 are preferably a combined unit such as the Proxim Spread Spread Transceiver described above. Using matching sets of these types of units has the advantage that each set of receivers/transmitters can be preset before use to respond only to units of the same set. This not only increases security, but does so without separate security data being encoded and transmitted with each use.

Information thus needed is then passed along in a standard form such as the convention used by an RS 232 communications port to a personal computer 48. This personal computer contains in addition to the processing unit, keyboard 50 and statistical software 52. The keyboard allows the speaker or his assistant to manipulate the data by means of the statistical software package such as Lotus 1, 2, 3 in any manner that is allowed by the software package. This gives the speaker substantial flexibility in the way that the data is analyzed.

After such statistical analysis, as performed by the software, the results are presented on display 18. Additional features may also be included with the base station and audience module packages to ensure smooth operation and provide additional flexibility.

For instance, the base station 14 may further include a modulator/transmitter 54, which transmits a radio frequency signal to the audience module. In the embodiment described herein, the Proxim unit used includes such a transmitter 54 along with receiver 42 and electromagnetic demodulator 44. This radio frequency transmission includes the module identification number 34 as described in the audience module. The transmission from the base station further includes a cue associated with a unique module identification indicating that particular audience module should transmit its response.

Referring back to FIG. 3. With this particular embodiment, audience module 12 further comprises the receiver/demodulator 56 which receives the transmission from the base station supplying a module identification and a cue to transmit. This receiver/demodulator is in this embodiment part of the Proxim unit also containing modulator 38 and transmitter 40. If the module identification matches that of a particular audience module, the data contained in the terminal 32 is then modulated and transmitted to the ready and receptive base station.

In this way, transmission from the plurality of audience modules can be accomplished in an orderly fashion without overlap or interference from more than one audience module transmitting at a given time.

In addition, the transmission from the base station to an audience module may also include information either specific to a particular module, or general to all modules which can then be displayed on the liquid crystal display 26 of the audience module. Because the audience module contains memory 36, having in this embodiment 512 kilobytes of data storage, substantial amounts of information may be transferred. For instance, detailed individual performance results for a businessman of student could be transmitted to such a group by a business manager or teacher, respectively, and the subsequent presentation received in light thereof.

Further, information identifying not only the specific module, but the individual using the module can be stored in module memory 36. This information can also be transmitted along with the response provided by the member of the audience. Referring to FIG. 4 this information once received in the data collector 46, can be collated with information on particular individuals in the audience and their affiliation or function in dossier 58 contained in the memory of computer 16.

This information along with statistical software 52, allows responses by the audience to be displayed not only in the aggregate but also segregated by certain characteristics of the audience such as affiliation, function or position.

The communication between the base station and audience module is controlled by specifications known to those skilled in the art of computer data information exchange. Both the audience module and base station would use shared files which utilize a single field of record format. Data transfer to the base station would be a d-base compatible file structure in which every communication packet takes the form of a single record. Communication to the audience module would be an ASCII file which is a CR/LF delimiter between records.

Both files would have position sensitive data fields. For instance, the audience module identification would have 0 bytes offset, have a length of 4 bytes and consist of alpha numeric data. A command to the audience module would have an offset of 4 bytes and be 1 byte in length. Data transmitted from the module to the base station would have an offset of 5 bytes and a length of 250 bytes. Again, both of these consist of alpha numeric types of data.

The data field specified is optional depending upon the type of command specified. Blocks of data would be segregated by "," ("comma").

Every communication would be structured as described regardless of the direction of the flow of information, either to or from, the base station. Each communication would contain a terminal identification and command. Some commands would be unidirectional while others are defined for either the audience module or the base station.

The base station could indicate a broadcast to all terminals by issuing a predetermined terminal I.D. such as "9999".

A sample of typical commands, their direction and the type of data flow is as follows:

| Command | Description | Direction | data |
|---------|-------------|-----------|------|
| a | answer to query | term→host | yes-1 char |
| b | brochure answer | term→host | yes-multi char |
| c | cancel question | term→host | no |
| k | login acknowledge | host>term | yes-multi char |
| l | login request | term>host | yes-user id |
| m | message | host→term | Yes-multi char |
| o | logout | host→term | no |
| q | question | term→host | no |
| s | screen request | host→term | yes-multi char |

In more detail, when the audience modules are turned on, they prompt the user to enter their personal identification. The L command is sent to the base station along with the user's identification number in the data field if the base station's accepting logins, it will respond with a K command directed to that audience module. The K command can contain a text message in the data field to be displayed on the screen. If the base station is not accepting logins, it ignores the request without a response. When a unit is powered off it assumes that it has been logged off.

The K command is a login acknowledgement as described above wherein it instructs the terminal to display the accompanying message and display the main menu.

The O command is a logout command which forces the module to go into the login screen, prompting the user for his identification as if the terminal is powered off and then turned on.

The N command allows the base station to send any message to any terminal that is logged in. The message will stay on display until the user clears it by entering the appropriate response.

The S command is a screen request which is initiated by the base station by displaying prompts and requesting the user to respond with a single defined response. The first parameter in the data field is the number of prompts that will be displayed on the screen. A comma also delimits the prompt with its associated single character response. Every prompt must have a response accompanying it. The single character response parameter will return to the base station by way of the A command.

By way of example, the data 1 2 3 4 s 4, YES, NO, MAYBE, DON'T CARE will produce Y, N, M, D.

The A answer command only occurs after the base station sends an S command. The A command returns in its data field a single number response indicating the relative position of the question.

The user may signal the base station that he has a question to ask the presenter by entering the appropriate preassigned response on the module wherein the cue command is sent to the base station. If the user wishes to cancel his query after providing the appropriate input, the module sends a C command to the base station.

As can be appreciated by one of ordinary skill in the art, these commands and format are easily modified to meet particular requirements of a presentation and audience format.

In operation the method of the present invention is practiced as follows:

During the course of a presentation, a speaker poses to the audience a question requiring a response, and each member of the audience has an audience module as described above. Members of the audience respond by providing a physical input to the modules in their respective possession. This physical input to the module may be entering a response through an alpha numeric keypad, the a use of a bar code scanning light pen in conjunction with sheet containing bar codes and English language equivalent responses, or in particular situations, a voice input.

Information identifying the holder of each audience module may be entered into the module by either entering this information through the alpha numeric keypad or by the audience member placing his identification badge in a bar code scanner associated with the audience module.

In the embodiment where the audience module contains a second receiver and the base station contains a second transmitter, the audience module will only transmit its response to the base station upon receiving a cue to transmit along with its particular identification number from the base station. The audience module then transmits the response from the module by means of an electromagnetic signal. The electromagnetic signals are received at the base station and the aggregate response received from all of the audience modules is then compiled in a computer and the results of said compilation of responses is displayed during the course of the presentation.

When information identifying the individual audience member is placed into the audience module in the possession of the individual, this information may be transmitted as part of the transmitted response. By having a dossier in the base station, the displayed compiled responses may then include identifying information in the displayed compilation.

An additional feature that may be incorporated into the system is the ability for the speaker to pose a question that requires verbal communication. The response from an audience member can include an indication that such a verbal exchange such as asking a question or providing additional information, is forthcoming. The voice input into the audience module via a microphone is digitized and conveyed as data to the base station computer for processing. Such spoken input by an audience member may then be amplified through the speaker's voice amplification system for all the audience to hear. Another application of this transmission of voice as data is the ability to transmit individualized data streams to various audience modules (e.g., language translation or messages) which can be reconstructed by the module as voice using digital-to-analog converter circuitry and a speaker.

Other applications of this invention are possible based upon the needs of the user and are considered to be within the scope of the invention as described by the claims as follows.

We claim:

1. An apparatus for communication between a speaker and his audience, said apparatus comprising:
    a plurality of audience modules, each module having:
        input means activatable by a member of the audience, encoding means for transforming the response represented by said input into an encoded electrical pattern, a modulator for producing an electromagnetic signal corresponding to said encoded electrical pattern, means for including module identifying information associated with said audience module in the modulated electromagnetic signal, a first transmitter for sending said electromagnetic signal, where at least two of said plurality of audience modules have first transmitters with the same transmission frequency, means for entering audience member identifying information pertaining to the audience member using said module into said audience module for transmission with the modulated electromagnetic signal, and a first receiver for capturing an electromagnetic signal containing a cue for said first transmitter to initiate transmission of said encoded electrical pattern;

a base station for use by the speaker, said base station having a second transmitter for transmitting an electromagnetic signal containing said cue to said audience module that the base station is prepared to receive a transmission from one of said plurality of audience modules designated by said module identifying information a second receiver for capturing said electromagnetic signals produced by a plurality of audience modules, a demodulator for reproducing said encoded electrical pattern, collection means for storing information encoded in said encoded electrical pattern, a computer for performing statistical analysis upon said information, and a display for presenting the results of said statistical analysis from the computer to the speaker.

2. The device of claim 1 wherein said base station further comprises means for associating and presenting said audience member identifying information with said statistical analysis.

3. The device of claim 1 wherein said display is a display to the audience.

4. The device of claim 1 wherein said base station comprises a file containing an audience dossier individually associated with said identifying information of the audience member using an audience module by said computer.

5. A method of determining at a base station the response of a plurality of members of an audience to a presentation, said members having in their respective possession a module, said module comprising an input means for entering into said module audience member identifying information pertaining to the audience member using said module, means to input into said module a response to said presentation, a first transmitter for sending a modulated electromagnetic signal, means for including module identifying information associated with said audience module in a transmitted electromagnetic signal, and a first receiver for capturing an electromagnetic signal containing a cue to for said first transmitter to initiate transmission of said modulated signal, and said base station comprising a second receiver for receiving an electromagnetic signal, a second transmitter for sending said cue, a computer and a display, said method comprising the steps of:

members of said audience placing identifying information related to the audience member having possession of said module into said module, posing a question requiring a response to said audience, members of said audience responding by providing a physical input to the modules in their respective possession, said second transmitter transmitting an electromagnetic signal containing said cue indicating that the base station is prepared to receive a transmission from one of said plurality of audience modules designated by said module identifying information, said first receiver capturing said electromagnetic signal containing said cue to for said first transmitter to initiate transmission of said modulated signal, said first transmitter transmitting said response and said identifying information from said module by means of an electromagnetic signal, said base station receiving from said audience module the electromagnetic signal containing said response and said identifying information, compiling said received responses in the computer at said base station, displaying the results of said compilation of responses on the display during the course of said presentation.

6. The method of claim 5 further comprising compilation of said audience member identifying information along with said responses provided and including identifying information in said displayed compilation.

7. The method of claim 5 wherein the question requires verbal communication and the response from the audience member is an indication to provide such a verbal exchange.

8. The method of claim 5 wherein said computer comprises a file containing an audience dossier individually associated with said identifying information of the audience member, the method further comprising the step of:

associating the responses of audience members with common dossier characteristics in displaying the audience responses.

* * * * *